Nov. 2, 1926.
J. J. LAWLER
1,605,669
AUTOMATIC HEAT CONTROLLING REGULATOR
Filed Jan. 14, 1926   3 Sheets-Sheet 1
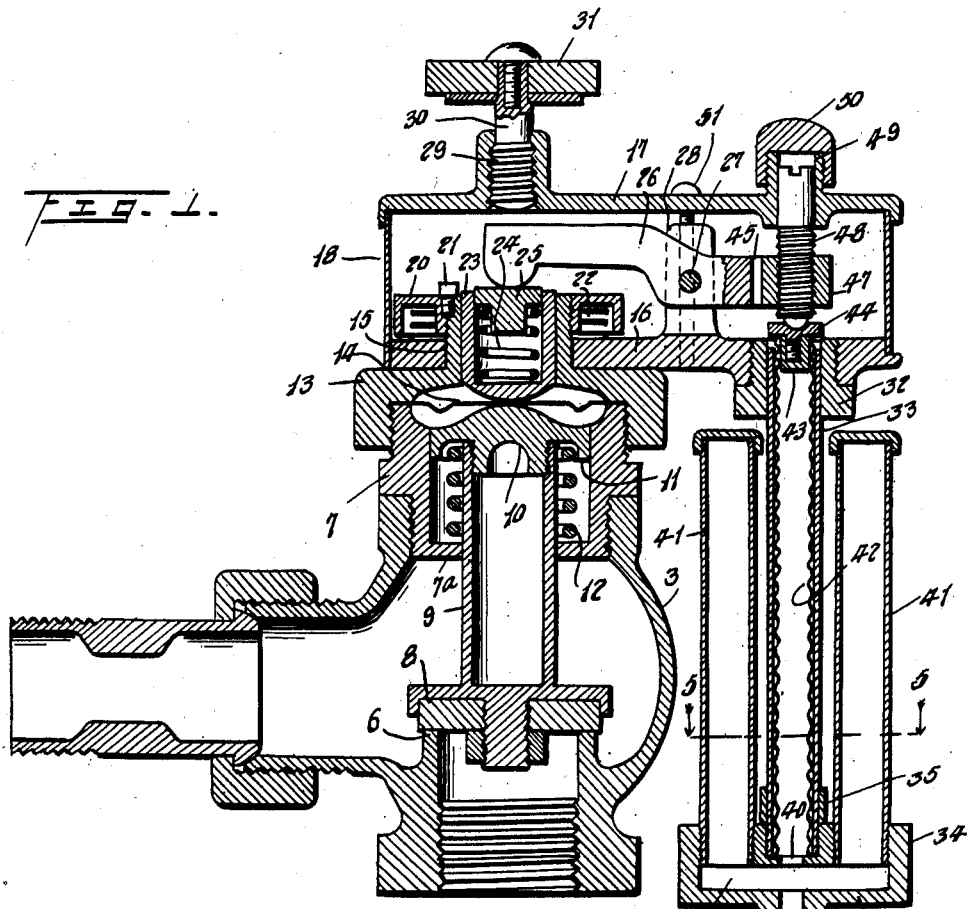
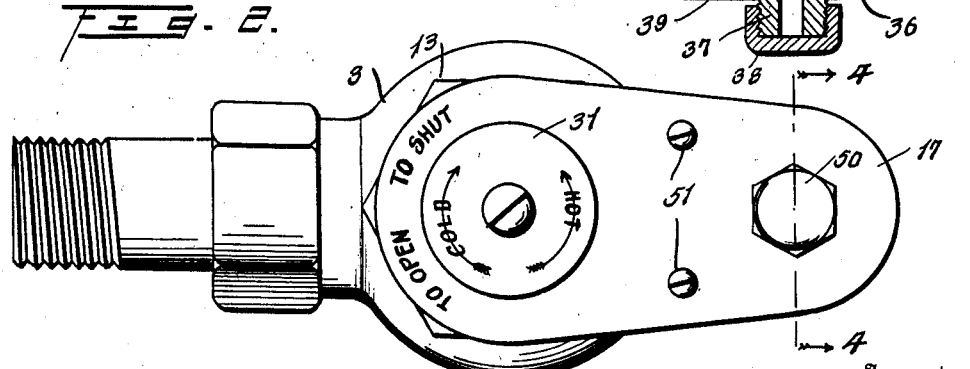
Inventor
J. J. Lawler.
By Bryant & Lowry
Attorneys Nov. 2, 1926. 1,605,669
J. J. LAWLER
AUTOMATIC HEAT CONTROLLING REGULATOR
Filed Jan. 14, 1926   3 Sheets-Sheet 2
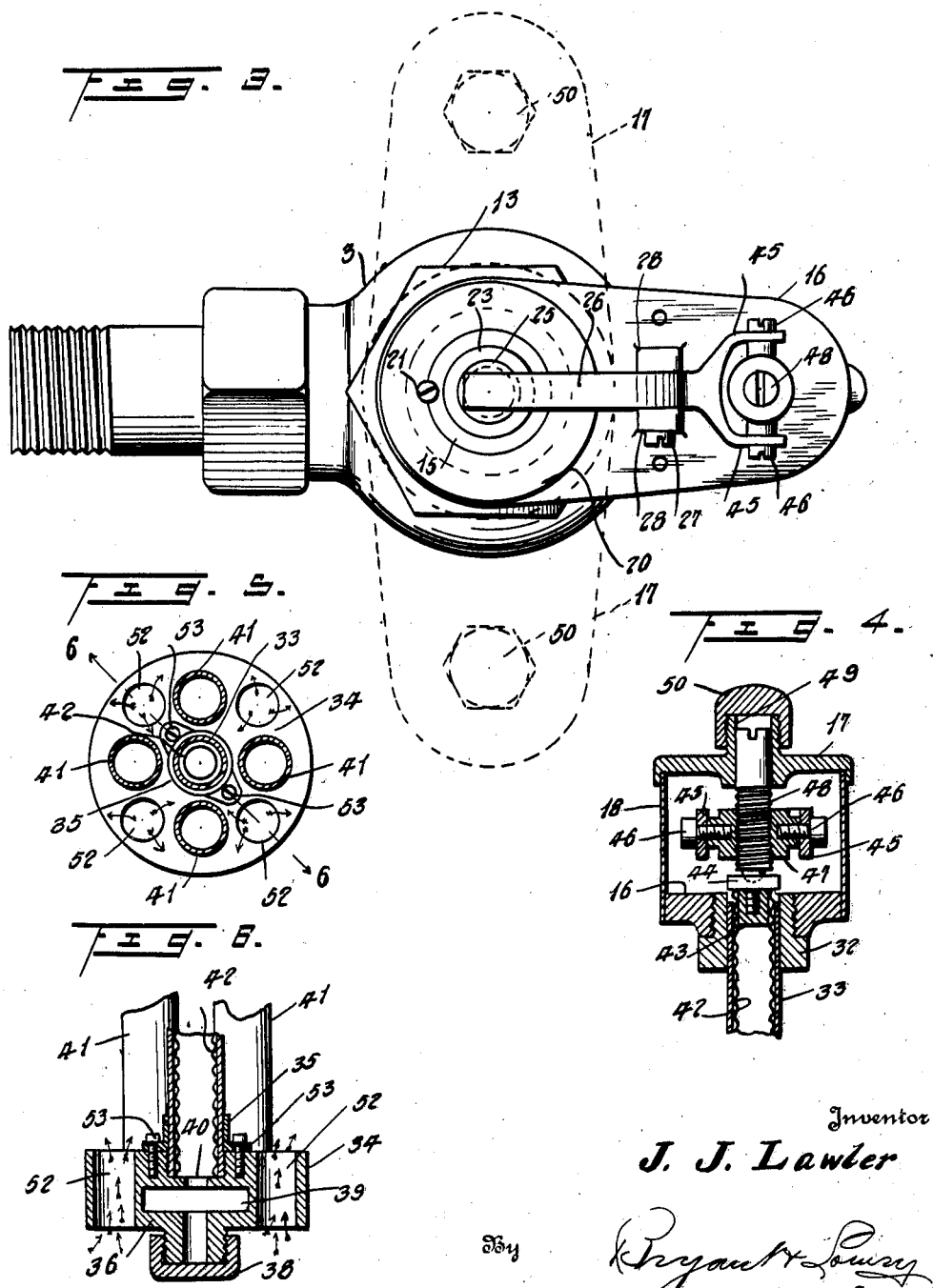
Inventor
J. J. Lawler
By Bryant & Lowry
Attorneys

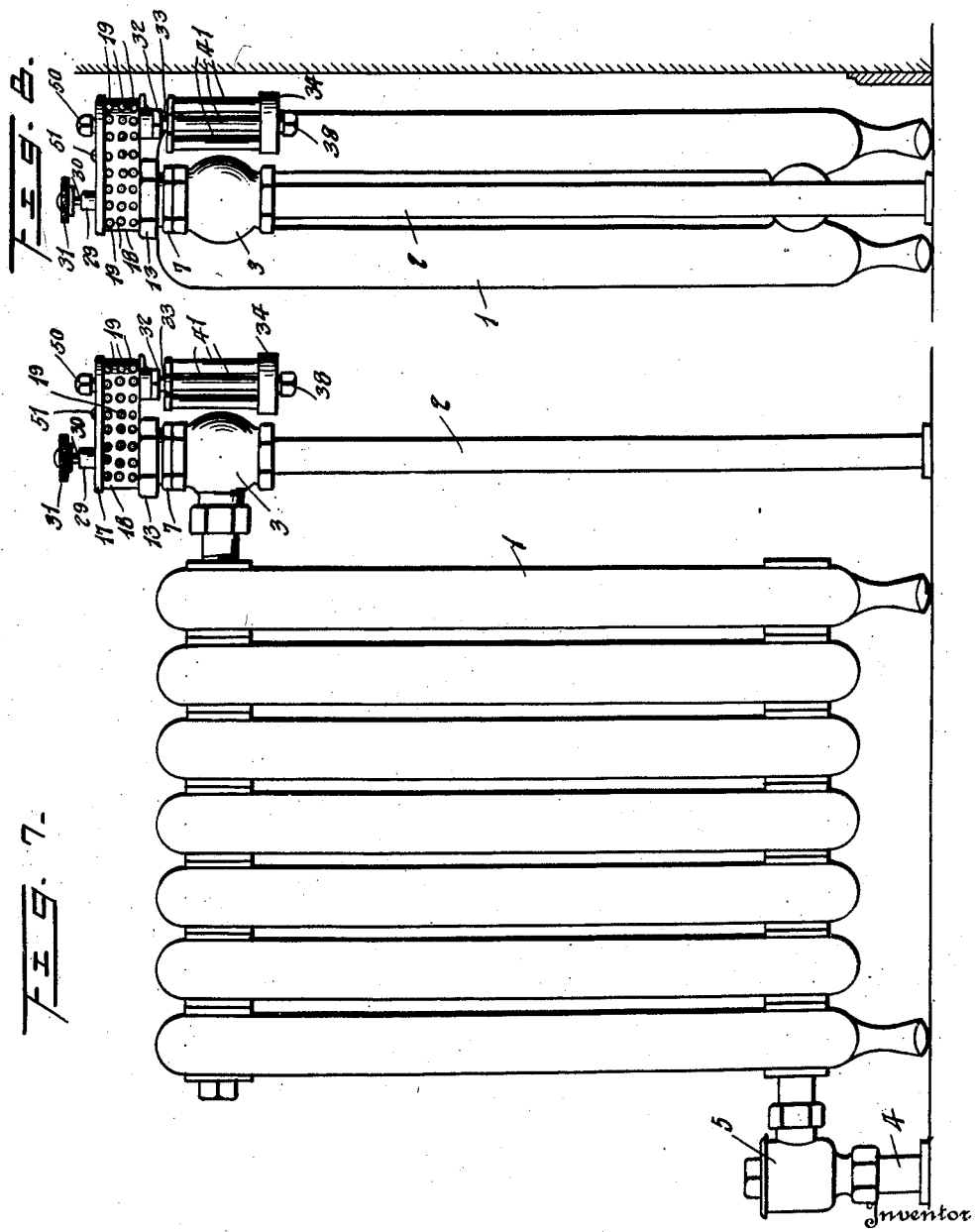

Patented Nov. 2. 1926.

1,605,669

UNITED STATES PATENT OFFICE.

JAMES J. LAWLER, OF MOUNT VERNON, NEW YORK.

AUTOMATIC HEAT-CONTROLLING REGULATOR.

Application filed January 14, 1926. Serial No. 81,332.

This invention relates to certain new and useful improvements in automatic heat controlling regulators, and while the invention is adaptable for regulating and controlling heat for various purposes, the same is primarily designed as a controlling and operating device for the valve that controls the flow of heating medium through a radiator to maintain a constant temperature of air surrounding the regulator within a room or other compartment.

Among other objects of the invention is to provide improvements in the general art to which this invention relates, more particularly with reference to the patent granted to James J. Lawler on September 29, 1925, bearing No. 1,555,592.

The invention primarily relating to an automatic heat controlling regulator for radiators, it is intended that the regulator being associated with the inlet valve for the radiator and in different installations of such radiators, it is essential that this regulator be freely adjustable relative to the radiator valve, a fluid-tight connection being established between the regulator and valve casing and embodying a tensioning element for holding the regulator in its adjusted position and eliminating the employment of any other form of hold-fast devices.

With the above and other objects in view which will become apparent as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a vertical longitudinal sectional view through a valve casing with the regulator operatively mounted thereon, Figure 2 is a top plan view of the regulator and valve casing, Figure 3 is another top plan view of the regulator and valve casing showing the regulator in different adjusted positions by dotted lines, Figure 4 is a detail sectional view taken on line 4—4 of Fig. 2 showing the adjustable screw connection between one end of the valve operating lever and the thermostatic element, Figure 5 is a horizontal sectional view taken on line 5—5 of Fig. 1, Figure 6 is a detail sectional view taken on line 6—6 of Fig. 5, Figure 7 is a side elevational view of a radiator equipped with the automatic heat controlling regulator with the latter extending in the same vertical plane with the radiator, and Figure 8 is an end elevational view of the radiator showing the regulator disposed at an angular position with respect to the radiator for occupying a remote position.

In the accompanying drawings which show the preferred embodiment of the present invention, and with particular reference to Figs. 7 and 8, the reference numeral 1 designates the radiator of the type usually employed as heating devices, there being provided a supply pipe 2 for conveying the heating medium to the radiator thru the valve casing 3 while said radiator has an outlet pipe 4 connected thereto with a steam trap 5 or similar device interposed between the radiator and outlet pipe 4.

The construction of the valve casing 3 is shown more clearly in Fig. 1, said valve casing being of the globe type and including a valve seat 6 alined with the cage 7 positioned thereabove and removably mounted in the valve casing, and with which cage, a valve is associated. The valve 8 for closing upon the seat 6 as shown in Fig. 1 is carried by a tubular stem 9 that extends upwardly through a central opening in the bottom wall of the cage 7 and the open upper end of said valve stem 9 receives a threaded plug 10 carrying an annular flange 11 outwardly of the valve stem while a coil spring 12 surrounds the valve stem between the flange 11 and bottom wall 7ª of the valve cage 7. Under influence of the spring 12, the valve 8 has a tendency to be normally unseated while the opening movement of said valve is limited by the cap 13 that is removably threaded upon the upper end of the cage 7, a fluid-tight diaphragm 14 being interposed between the upper end of the valve cage and cap 13 to prevent the escape of any heating medium around the valve stem. The flange 11 carried by the closure plug 10 for the valve stem works in the fashion of a piston against the inner wall of the valve cage 7 as will at once be understood from an inspection of Fig. 1, so that the valve 8 is constantly alined with its seat 6.

The automatic heat controlling regulator is superposed upon the valve casing 3 and is directly supported upon the cap 13, said cap having a central opening surrounded by an upstanding externally threaded tubular boss 15, the lower external face of which boss is planed for supporting in a freely retatable manner, the bottom wall 16 of the regulator casing. The top wall 17 of the casing is spaced from the bottom wall by the enclosing side wall 18 that is perforated over its entire surface as at 19 as shown in Figs. 7 and 8 to permit a free circulation of air through the casing, the general design and configuration of the top and bottom walls and side wall of the casing being shown more clearly in Figs. 2, 3, 7, and 8. One end of the bottom plate 16 of the regulator casing is provided with an opening for rotatable mounting upon the tubular boss 15 with the other end of the casing being positioned laterally of the valve casing 3. To permit relatively free adjustment of the regulator casing upon the tubular boss 15 and to retain said casing in its adjusted position, there is provided a channel-shaped ring 20 that is internally threaded for threaded engagement with the upper end of the tubular boss 15, said ring being retained in position on the boss by the stud screw 21 engaging cooperating threaded recesses in adjacent faces of the boss and ring, this connection being clearly shown in Fig. 1. A spring 22 is enclosed by the channel-shaped ring and engaging at its opposite ends, the ring and bottom wall 16 of the regulator casing, said casing is frictionally retained in its adjusted position upon the cap 13.

Devices are provided for manually controlling the valve 8 and include a cup-shaped plug 23 freely slidable within the tubular boss 15 with the lower end of said plug engaging the diaphragm 14 and the upper side of the plug 10 in the upper end of the valve stem. A coil spring 24 within the plug 23 engages the lower end of said plug and at its upper end supports a flanged block 25. A lever 26 is fulcrumed upon the pin 27 that is supported in spaced ears 28, one end of the lever 26 overlying the block 25 as shown in Fig. 1. Vertically alined with the block 25 is an upstanding internally threaded boss 29 carried by the cover 17 of the regulator casing and in which boss an operating rod 30 is threaded, the disk head or handle 31 of said rod being employed for raising and lowering the same to engage the end of the lever 26 positioned therebeneath for moving the block 25 downwardly against the tension of the spring 24 to cause the cup-shaped plug 23 to be lowered to engage the plug 10 at the upper end of the valve stem 9 to close the valve 8 upon its seat 6. It will, therefore, be seen that the valve 8 may be manually controlled while the opening movement of said valve may be regulated by adjusting the rod 30 relative to the adjacent end of the lever 26.

The automatic operation of the lever 26 to effect closing movement of the valve 8 is occasioned by thermostatically controlled devices associated with the opposite end of said lever and the outer swinging end of the regulator casing. The bottom wall 16 of the regulator casing adjacent the outer swinging end thereof is provided with a threaded opening that receives a jamb nut 32 that carries a tubular member 33, the lower end of the tubular member 33 being externally threaded for reception in the threaded socket positioned centrally of the shell 34 to support the latter, said shell being further secured to the lower end of said tubular member by the ring 35 enclosing the lower end thereof and being swaged or otherwise secured thereto. The shell 34 being of hollow formation, the bottom wall 36 thereof is provided with a central depending nipple 37 closed by a screw cap 38, the interior chamber 39 of said shell communicating with the tubular member 33 by means of the opening 40 in the upper wall of the shell, this construction being clearly shown in Fig. 1 of the drawings. A plurality of stand pipes 41 closed at their upper ends have their lower open ends seated in openings in the upper wall of the shell 34 by a screw threaded engagement so that communication between the tubular member 33, stand pipes 41 and shell 34 is established.

The horizontally corrugated tubular expansive member 42 is positioned in the tubular member 43, the lower end thereof being suitably secured to the lower end of the tubular member while the upper end of the expansive member receives a closure plug 43 that is permanently secured therein in a fluid-tight manner. A wear plate 44 is removably attached to the plug 43 and is provided with a flange extending in line with the upper end of the tubular member 33 so that when the expansive member 42 contracts the wear plate 44 will limit such movement as will at once be apparent from an inspection of Fig. 1 of the drawings.

As shown in Fig. 3, that end of the lever 26 adjacent and above the wear plate 44 is forked to provide spaced arms 45 having end opening slots for freely supporting the screw pins 46 that are carried by the nut 47 as shown in Fig. 4. A regulating screw 48 is adjustably threaded through the nut 47 and the upper end of said screw is freely slidable in the tubular box 49 carried by the top wall 17 of the regulator casing, the upper end of the tubular boss 49 being closed by the screw cap 50. The cap 50 may be removed and a suitable instrument engaged in the kerf at the upper end of the screw 40 for adjusting the same relative to the wear plate 44 upon the plug 43. Access to the interior of the regulator casing for repair or other purposes is possible by removing the upper wall 16 thereof upon loosening the anchoring screws 51 while a free circulation of air through the regulator casing is permitted by the provision of the openings 19 in the side wall 18. Air is also permitted to circulate through the shell 34 by the provision of the openings 52 in said shell positioned between the stand pipes 41 as shown in Fig. 6 and as a further means of anchoring the tubular member 33 to said shell, there is also illustrated in Fig. 6 screw anchored ears 53 carried by the ring 35.

The shell 34, expansive member 42 and stand pipes 41 are filled with a fluid, such as oil through the nipple 37. The effective length of throw or movement of the lever 26 that is automatically moved upon its fulcrum point 27 by expansion of the member 32 is regulated by adjusting the screw post 48 in the nut 47 and as illustrated in Fig. 1, said expansive member 42 is extended with the wear plate 44 engaging the lower end of the screw post with the lever 26 engaging and depressing the cup-shaped plug 23 for lowering the valve 8 against the tension of the spring 12 upon its seat 6. The expansive member 42 being thermostatically controlled in its operation by the surrounding temperature of the atmosphere affecting the fluid hermetically sealed therein, said expansive member 42 will contract upon a lowering degree of temperature which will move the wear plate 44 downwardly and be limited in such movement by engaging the upper end of the tubular member 33, during which movement, the spring 12 engaging the bottom wall 7ª of the cage 7 and the flange 11 upon the plug 10 will elevate the valve 8 from its seat and also elevate the cup-shaped plug 23. It will, therefore, be seen that by manual adjustment of the screw post 48 the temperature of the atmosphere surrounding the heat controlling regulator may be maintained constant while the valve 8 is automatically opened and closed as required. In order to retain the valve 8 closed upon its seat, irrespective of surrounding temperatures, the stem 30 is lowered through the upper wall 17 of the regulator casing to engage the adjacent end of the lever 26 for manually closing the valve upon its seat. By the provision of the cup-shaped plug 23 and the spring supported block 25 interposed between said plug and lever 26, excessive wear and strain on the adjacent part is considerably relieved as continued expansion of the member 42 after the closing of the valve upon its seat will only work against the spring supported block 25 and in no manner injure the cup-shaped plug 23 or the valve and its seat. Also, by the provision of the channel-shaped ring 20 and the spring 22 enclosed thereby that cooperates with the bottom wall 16 of the regulator casing and the cap 13, the entire regulator structure may be freely shifted to assume various positions relative to the radiator 1 as illustrated in Figs. 7 and 8 so that various installations of the radiators may be accomplished with the regulator accommodating itself to various positions relative to the radiator. It will also be understood from an inspection of Figs. 3 and 4 that movement of the expansive member 42 and screw post 48 will be in direct alinement, which movement is permitted by the slotted arms 45 at one end of the lever 26 freely supporting the nut 47. The wear plate 44 may also be removed from the plug 43 for replacement when desired, while access to the interior of the regulator casing is obtained upon removal of the cover 17 when the anchoring bolts 51 are released.

By the provision of the openings or air passages 52 in the shell 34, there is an increased radiating surface that renders the thermostat more sensitive to surrounding air temperatures of a room and insures the correct operation of the valve 8 upon changes in temperatures to maintain a constant room temperature for which the regulator has been set. The arrows illustrated on Figs. 5 and 6 indicate the direction of air flow through the shell openings 52.

While there is herein shown and described the preferred embodiment of the present invention, it is nevertheless to be understood that minor changes may be made therein without departing from the spirit and scope of the invention as claimed.

What is claimed is:—

1. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, and a tensioned member associated with the boss and regulator unit for frictionally holding the latter in adjusted positions.

2. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, and a tensioned member associated with the boss and regulator unit for frictionally holding the latter in adjusted positions, said regulator unit comprising a fulcrumed lever with one end above the actuator.

3. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, and a manually operable stem for engaging the lever to operate the actuator to hold the valve upon its seat.

4. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said actuator including a cup-shaped plug, and a spring supported block in the plug interposed between the plug and cooperative part of the regulator unit.

5. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, said actuator including a cup-shaped plug, and a spring supported block in the plug interposed between the plug and cooperative part of the regulator unit.

6. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, a manually operable stem for engaging the lever to operate the actuator to hold the valve upon its seat, said actuator including a cup-shaped plug, and a spring supported block in the plug interposed between the plug and cooperative part of the regulator unit.

7. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, and a thermostatically expansive fluid containing member engaging the adjacent end of the lever for the automatic operation of the valve.

8. In an automatic heat controlling regulator, a valve casing, a cage mounted in said casing, a reciprocating valve carried by the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, a manually operable stem for engaging the lever to operate the actuator to hold the valve upon its seat, and a thermostatically expansive fluid containing member engaging the adjacent end of the lever for the automatic operation of the valve.

9. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, a thermostatically expansive fluid containing member engaging the adjacent end of the lever for the automatic operation of the valve, and an adjustable screw post associated with the lever above the expansive member for varying the operative length of movement of the regulating mechanism.

10. In an automatic heat controlling regulator, a valve casing, a cage mounted in said casing, a reciprocating valve carried by the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, a manually operable stem for engaging the lever to operate the actuator to hold the valve upon its seat, a thermostatically expansive fluid containing member engaging the adjacent end of the lever for the automatic operation of the valve, and an adjustable screw post associated with the lever above the expansive member for varying the operative length of movement of the regulating mechanism.

11. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said actuator including a cup-shaped plug, a spring supported block in the plug interposed between the plug and cooperative part of the regulator unit, said tensioned member including a ring attached to the boss above a movable part of the regulator unit and a spring interposed between the ring and adjacent part of the regulator unit for frictionally holding the regulator unit in any adjusted position.

12. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, said actuator including a cup-shaped plug, a spring supported block in the plug interposed between the plug and cooperative part of the regulator unit, said tensioned member including a ring attached to the boss above a movable part of the regulator unit and a spring interposed between the ring and adjacent part of the regulator unit for frictionally holding the regulator unit in any adjusted position.

13. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, a manually operable stem for engaging the lever to operate the actuator to hold the valve upon its seat, said actuator including a cup-shaped plug, a spring supported block in the plug interposed between the plug and cooperative part of the regulator unit, said tensioned member including a ring attached to the boss above a movable part of the regulator unit and a spring interposed between the ring and adjacent part of the regulator unit for frictionally holding the regulator unit in any adjusted position.

14. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, and independently operable devices for manually holding the valve closed on its seat, and regulating the length of movement of the devices for automatically closing the valve.

15. In an automatic heat controlling regulator, a valve casing, a cage mounted in said casing, a reciprocating valve carried by the cage, a spring in the cage for opening the valve, a cap on the cage, a tubular boss carried by the cap in axial alinement with the valve, a tensioned actuator freely mounted in said boss, a laterally projecting thermostatic valve regulator unit pivotally mounted on said cap and boss and operatively engaging said actuator, a tensioned member associated with the boss and regulator unit for frictionally holding the latter in adjusted positions, said regulator unit comprising a fulcrumed lever with one end above the actuator, and independently operable devices for manually holding the valve closed on its seat, and regulating the length of movement of the devices for automatically closing the valve.

In testimony whereof I affix my signature.

JAMES J. LAWLER.